United States Patent
Kumar et al.

(10) Patent No.: US 10,243,810 B2
(45) Date of Patent: Mar. 26, 2019

(54) ASSESSING QOE OF A SERVICE IN A COMMUNICATION NETWORK

(71) Applicant: Telefonaktiebolaget LM Ericsson (publ), Stockholm (SE)

(72) Inventors: N Hari Kumar, Chennai (IN); Karthikeyan Premkumar, Chennai (IN); Ranjani Balakrishnan, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 256 days.

(21) Appl. No.: 15/119,275

(22) PCT Filed: Feb. 17, 2014

(86) PCT No.: PCT/SE2014/050191
§ 371 (c)(1),
(2) Date: Aug. 16, 2016

(87) PCT Pub. No.: WO2015/122818
PCT Pub. Date: Aug. 20, 2015

(65) Prior Publication Data
US 2017/0012833 A1    Jan. 12, 2017

(51) Int. Cl.
*G06F 15/173* (2006.01)
*H04L 12/24* (2006.01)
(Continued)

(52) U.S. Cl.
CPC .... *H04L 41/5009* (2013.01); *H04L 29/06523* (2013.01); *H04L 41/5019* (2013.01);
(Continued)

(58) Field of Classification Search
CPC ...... H04W 24/00–24/10; H04W 28/00–28/26; H04L 29/06523;
(Continued)

(56) References Cited

U.S. PATENT DOCUMENTS 9,344,908 B2 *  5/2016  Wynn ................. H04L 41/5067
9,379,948 B1 *  6/2016  Gegout ............... H04L 41/5067
(Continued)

FOREIGN PATENT DOCUMENTS

| CN | 1839597 A | 9/2006 |
| CN | 102143388 A | 8/2011 |
| WO | WO 2005022852 A1 | 3/2005 |

OTHER PUBLICATIONS

International Search Report, Application No. PCT/SE2014/050191, dated May 27, 2014.
(Continued)

*Primary Examiner* — Brendan Y Higa
(74) *Attorney, Agent, or Firm* — Sage Patent Group (57) ABSTRACT

The present disclosure relates to a method performed by a network element in an operator network for assessing a quality of experience (QoE) of a service for a radio device. The method comprises receiving a first value of a key performance indicator (KPI) of the service from the radio device. The method also comprises receiving a second value of the KPI from the operator network serving the radio device. The method also comprises comparing the first and the second values of the KPI, and determining any deterioration of the QoE over the operator network, based on said comparing. The present disclosure also relates to a method of the radio device as well as to the network element and the radio device.

14 Claims, 5 Drawing Sheets

(51) Int. Cl.
    *H04L 29/06*      (2006.01)
    *H04L 29/08*      (2006.01)
    *H04W 24/08*      (2009.01)
    *H04L 12/26*      (2006.01)

(52) U.S. Cl.
    CPC .............. *H04L 43/14* (2013.01); *H04L 65/80* (2013.01); *H04L 67/025* (2013.01); *H04L 67/322* (2013.01); *H04W 24/08* (2013.01)

(58) Field of Classification Search
    CPC .......... H04L 41/5003–41/5038; H04L 41/5061–41/5067; H04L 43/04; H04L 43/06–43/106; H04L 65/80; H04L 67/322
    See application file for complete search history.

(56) References Cited

U.S. PATENT DOCUMENTS

| | | | |
|---|---|---|---|
| 2003/0177235 A1* | 9/2003 | Grammel | H04L 41/5003 709/225 |
| 2005/0089043 A1* | 4/2005 | Seckin | H04L 41/5006 370/395.21 |
| 2010/0195496 A1 | 8/2010 | Holm-Öste et al. | |
| 2011/0090922 A1* | 4/2011 | Wang | H04L 65/4092 370/465 |
| 2013/0166731 A1* | 6/2013 | Yamanaka | H04L 41/5067 709/224 |
| 2013/0182578 A1 | 7/2013 | Eidelman et al. | |
| 2013/0237157 A1* | 9/2013 | Phan | H04W 24/00 455/67.11 |
| 2013/0326551 A1* | 12/2013 | Chatterjee | H04W 24/10 725/9 |
| 2014/0119196 A1* | 5/2014 | Hui | H04W 24/10 370/241 |
| 2015/0326447 A1* | 11/2015 | Yoon | H04L 41/5025 709/224 |

OTHER PUBLICATIONS

Written Opinion of the International Searching Authority, Application No. PCT/SE2014/050191, dated May 27, 2014.

Shaikh et al., "Quality of Experience from user and network perspectives", *Annals of Telecommunications*, vol. 65, Feb. 1, 2010, pp. 47-57.

First Office Action, Chinese Patent Application No. 201480075728.9, dated Nov. 19, 2018 (8 pages—Chinese-language document) and English-Language Version (3 pages).

* cited by examiner

Fig. 9

ASSESSING QOE OF A SERVICE IN A COMMUNICATION NETWORK

CROSS REFERENCE TO RELATED APPLICATION

This application is a 35 U.S.C. § 371 national stage application of PCT International Application No. PCT/SE2014/050191, filed on Feb. 17, 2014, the disclosure and content of which is incorporated by reference herein in its entirety. The above-referenced PCT International Application was published in the English language as International Publication No. WO 2015/122818 A1 on Aug. 20, 2015.

TECHNICAL FIELD

The present disclosure relates to methods and devices assessing a quality of experience (QoE) of a service provided to a radio device via an operator communication network.

BACKGROUND

Within telecommunications, customer experience plays a major role in improving customer satisfaction, which acts as a criteria to create loyal consumers and reduce churn. Due to this high-end requirement, telecom operators take various approaches to optimize network resources to optimally serve different types of consumers, improving their satisfaction level.

Thus, operators spend resources on enhancing their Quality of Service (QoS). However, there are various other problems due to which consumers are not able to have an optimal experience. This could be e.g. either due to problems faced at application provider end or due the mobile terminal used by the subscriber. The telecom operators are trying to understand the problems faced by consumers while using their services via a mobile terminal. Telecom operators are analysing their network data to capture the end-user experience in an indirect way.

There exists a business value in enabling the telecom operators to measure the QoE from user-end to the service providers, combined with the telecom profile of the user. This mashed data will be high value information for the service providers and application providers and help them to determine the type of service or incentive to be given to the users to make them loyal and reduce churn.

The paper "Quality of Experience from user and network perspectives", Junaid Shaikh et al., Annals of Telecommunications (2010) 65: 47-57, try to associate on one side the correlations between various traffic characteristics measured on an operator network and on the other side the user experience tested on an experimental platform.

As more and more application providers are coming into market, quality of experience is valuable information for them to understand how to remain in the competitive market.

SUMMARY

It is an objective of the present disclosure to provide methods and devices for facilitating for a telecom operator to assess the QoE for a user of a service at a radio device end. Thereby, the operator may indicate to service providers and application providers the experience of their customers.

According to an aspect of the present disclosure, there is provided a method performed by a network element in an operator network for assessing a QoE of a service for a radio device. The method comprises receiving a first value of a key performance indicator (KPI) of the service from the radio device. The method also comprises receiving a second value of the KPI from the operator network serving the radio device. The method also comprises comparing the first and the second values of the KPI. The method also comprises determining any deterioration of the QoE over the operator network, based on said comparing.

According to another aspect of the present disclosure, there is provided a computer program product comprising computer-executable components for causing a network element to perform an embodiment of a method of the present disclosure when the computer-executable components are run on processor circuitry comprised in the network element.

According to another aspect of the present disclosure, there is provided a network element comprising processor circuitry, and a storage unit storing instructions that, when executed by the processor circuitry, cause the network element to receive a first value of a KPI of a service from a radio device. The instructions also cause the network element to receive a second value of the KPI from an operator network serving the radio device. The instructions also cause the network element to compare the first and the second values of the KPI. The instructions also cause the network element to determine any deterioration of the QoE over the operator network, based on said comparing.

According to another aspect of the present disclosure, there is provided a computer program for assessing a QoE of a service for a radio device. The computer program comprises computer program code which is able to, when run on processor circuitry of a network element in an operator network, cause the network element to receive a first value of a KPI of the service from the radio device. The code is also able to cause the network element to receive a second value of the KPI from the operator network serving the radio device. The code is also able to cause the network element to compare the first and the second values of the KPI. The code is also able to cause the network element to determine any deterioration of the QoE over the operator network, based on said comparing.

According to another aspect of the present disclosure, there is provided a method performed by a radio device connected to an operator network. The method comprises running a service application. The method also comprises running a QoE application for assessing a QoE of the service for the radio device. The QoE application causes the radio device to measure a KPI of the service, to obtain a first value of the KPI. The QoE application also causes the radio device to send the first value to a network element in the operator network.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a radio device. The radio device comprises processor circuitry, and a storage unit storing instructions that, when executed by the processor circuitry, cause the radio device to run a service application of a service. The instructions also cause the radio device to run a QoE application for assessing a QoE of the service for the radio device. The QoE application is, when run by the radio device, configured for causing the radio device to measure a KPI of the service, to obtain a first value of the KPI. The QoE application is, when run by the radio device, also configured for causing the radio device to send the first value to a network element in the operator network.

According to another aspect of the present disclosure, there is provided a computer program comprising computer program code which is able to, when run on processor circuitry of a radio device connected to an operator network, cause the radio device to run a service application of a service. The code is also able to cause the radio device to run a QoE application for assessing a QoE of the service for the radio device. The QoE application is, when run by the radio device, configured for causing the radio device to measure a KPI of the service, to obtain a first value of the KPI. The QoE application is, when run by the radio device, also configured for causing the radio device to send the first value to a network element in the operator network.

According to another aspect of the present disclosure, there is provided a computer program product comprising an embodiment of a computer program of the present disclosure and a computer readable means on which the computer program is stored.

By the radio device sending, and the operator network receiving, a value of the KPI at the radio device, the QoE of the user of the radio device can be assessed better than based on KPI measurements in only the operator network. The operator may e.g. determine whether a problem resides in its own network or in the radio device. By means of embodiments of the present disclosure, the end-to-end experience, from the service provider all the way to the user of the radio device, can be measured by the operator by means of a real-time interface to the radio device enabling to obtain information about problems experienced by the user. An operator may e.g. give a discount to a user if the problems are related to the operator network, or may determine that the problem lies in the mobile device or the service provider end.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Embodiments of the present disclosure proposes a framework of measuring quality of experience KPIs at the radio device based on operator defined rules. The operator may thus decide which KPI should be measured at the radio device and may send instructions to this effect to the radio device over an over-the-air (OTA) gateway (GW). The measured KPIs are sent by the radio device to a network element of the operator network, which could be called a QoE Decision Engine, using the OTA GW over a public network.

The QoE Decision Engine may then correlate the received measurements with relevant KPIs measured in the operator network. It may then determine whether the measured KPI deviates from user-defined normal thresholds, subsequently to determine whether the problem is due to the operator's network or the service/application provider or the user's radio device. Based on the location of the problem, it may then trigger the charging system to provide appropriate discount/rebate for the radio device subscription in near real-time.

By means of some embodiments of the present disclosure, end-to-end measurements of QoE as perceived by a user of a radio device having a subscription with the operator is enabled. Further, by means of some embodiments of the present disclosure, real-time measurements of QoE from a dedicated channel of communication from the operator's network towards the radio device is enabled. Also, the operator's network may be optimised based on measurements of QoE made at the radio device. The operator may in some embodiments prioritise among its subscribers to provide a higher QoE of a service to high priority subscribers. In some embodiments, the network operator may inform the service provider of the QoE of its service at the user radio device, enabling the service provider to take appropriate action.

Figure 1:
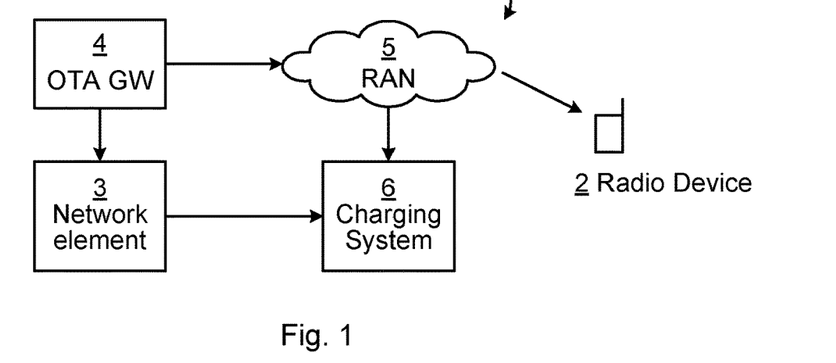
FIG. 1 is a schematic block diagram of an embodiment of an operator network serving a radio device, in accordance with the present disclosure.

FIG. 1 is a schematic block diagram of an embodiment of an operator network 1 serving a radio device 2, in accordance with the present disclosure. The operator network 1 comprises, among other elements/nodes, a radio access network (RAN) 5, a charging system 6, an over-the-air (OTA) gateway (GW) 4 and a network element 3 which is herein also referred to as a QoE decision engine for assessing the QoE of a service provided to the radio device 2. The RAN 5 may be in accordance with evolved UMTS Terrestrial Radio Access (e-UTRA) of a Long Term Evolution (LTE) communication standard. The RAN 5 serves the radio device 2 to provide the radio device 2 with a connection to the operator network 1 over an air interface. The OTA GW 4 is a system that creates as well as accepts Hypertext Transfer Protocol (HTTP) based OTA sessions to and/or from the radio device 2, e.g. a Universal Integrated Circuit Card (UICC) in the radio device. Thus, the OTA GW 4 provides an interface for two-way HTTP communication between the operator network 1, e.g. the core network (CN) of the operator network 1, and the radio device 2. The charging system 6 is configured to charge the radio device in accordance with the radio device's subscription with the operator network 1. The network (NW) element 3 may be or be integrated in a node in the operator NW 1. The NW element is in accordance with the present disclosure configured for receiving KPI measurements from the radio device 2 as well as from within the operator NW 1 and, based on those measurements, assess the QoE of a service at the radio device end and whether a poor QoE is due to problems in the operator NW or not. If it is determined that the problem resides within the operator NW1, the NW element 3 may e.g. instruct the charging system 6 to reduce the charging since the user of the radio device 2 may have the right to expect a better performance of the service in view of the subscription of the radio device. The radio device 2 may be any device or user equipment (UE), mobile or stationary, enabled to communicate over a radio cannel with the operator network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 2:
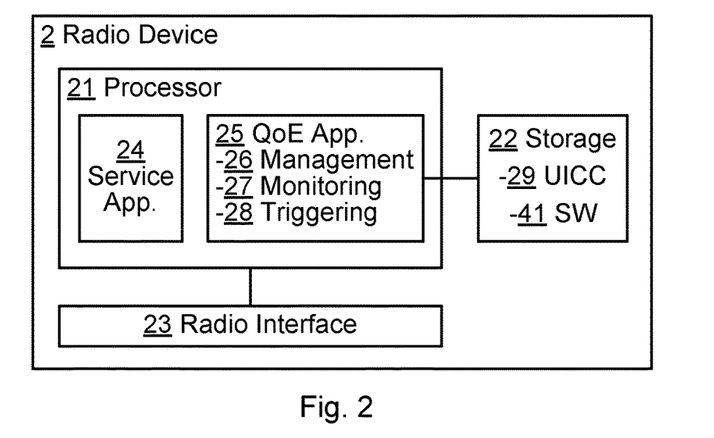
FIG. 2 is a schematic block diagram of an embodiment of a radio device in accordance with the present disclosure.

FIG. 2 is a schematic block diagram of an embodiment of a radio device 2 in accordance with the present disclosure. The radio device 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 41 (see also FIG. 4) stored in a storage 22 of one or several storage unit(s) e.g. a memory. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The radio device may comprise a UICC 29 which may form part of the storage 22, and at least some of the SW 41 of the storage 21 may be stored in the UICC 29. The SW 41 may comprise SW for a service application 24 which may be run in the processor circuitry 21 when the SW is executed thereby. The SW of the service application 24 may be provided by the service (also called service provider or application provider) discussed herein and provided via the operator NW 1. Further, the SW 41 may comprise SW for a QoE application 25 which may be run in the processor circuitry 21 when the SW is executed thereby. In accordance with embodiments discussed herein, the SW 41 of the QoE application 25 may be stored in the UICC 29 and may also be executed by processor circuitry of the UICC 29, which processor circuitry may be regarded as part of the general processor circuitry 21 of the radio device 2 but being dedicated to and part of the UICC 29. The QoE application may e.g. comprise a management module 26, a monitoring module 27 and/or a triggering module 28, which will be further discussed below. The SW for the QoE application may be provided by the NW element 3, as discussed herein. The processor circuitry 21 is also configured to store data in the storage 22, as needed. The radio device 2 also comprises a communication interface 23, typically a radio interface, e.g. comprising a transmitter, a receiver and an antenna, which may be combined to form a transceiver or be present as distinct units within the radio device 2. The transmitter is configured to cooperate with the processor circuitry 21 to transform data bits to be transmitted over the radio interface 23 to a suitable radio signal in accordance with the radio access technology (RAT) used by the RAN 5 via which the data bits are to be transmitted. The receiver is configured to cooperate with the processor circuitry 21 to transform a received radio signal to data bits.

Figure 3:
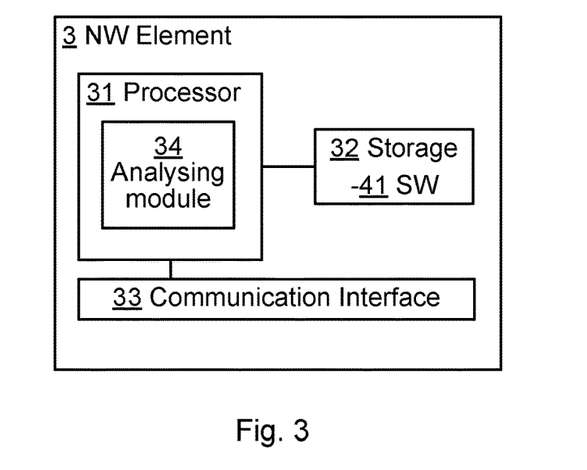
FIG. 3 is a schematic block diagram of an embodiment of a network element in accordance with the present disclosure.

FIG. 3 is a schematic block diagram of an embodiment of a network element 3 in accordance with the present disclosure. The network element 3 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 41 (see also FIG. 4) stored in a storage 32 of one or several storage unit(s) e.g. a memory. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The SW 41 may comprise SW for an analysing module 34 which may be run in the processor circuitry 31 when the SW is executed thereby. The processor circuitry 31 is also configured to store data in the storage 32, as needed. The network element 3 also comprises a communication interface 33, e.g. comprising a transmitter and a receiver, which may be combined to form a transceiver or be present as distinct units within the network element 3, for sending and receiving communication signals to/from other elements of the operator NW 1, ultimately communicating with the radio device 2 over the RAN 5 as discussed herein.

Figure 4:
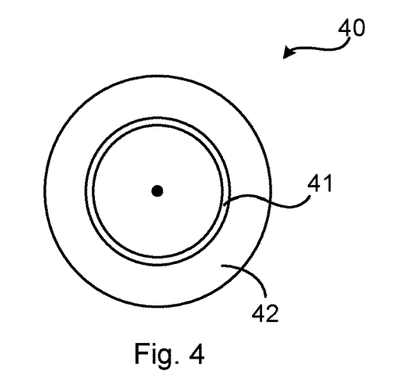
FIG. 4 is a schematic illustration of an embodiment of a computer program product in accordance with the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause a device, e.g. the radio device 2 or the NW element 3 as discussed herein, to perform an embodiment of a method of the present disclosure. The computer program/computer-executable components may be run on the processor circuitry 21/31 of the device for causing the device to perform the method. The computer program product 40 may e.g. be comprised in a storage unit or memory 22/32 comprised in the device and associated with the processor circuitry 21/31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

Figure 5A:
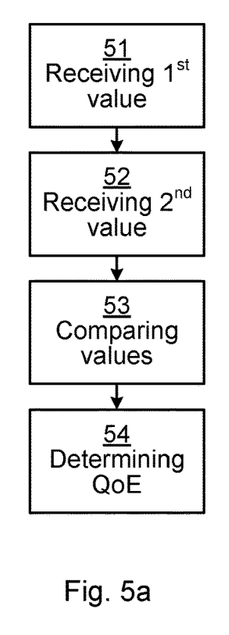
FIG. 5a is a schematic flow chart of an embodiment of a method performed by a network element, in accordance with the present disclosure.

FIG. 5a is a schematic flow chart of an embodiment of a method performed by a network element, in accordance with the present disclosure. A first value of a key performance indicator (KPI) of a service is received 51 from the radio device 2. Before, after or concurrently with the receiving 51 of the first value, a second value of the KPI is received 52 from the operator network 1 serving the radio device 2. The second value may have been measured at any suitable node or interface for obtaining a value of the KPI which is representative for the operator NW 1. The second value may e.g. be measured at an interface between the operator NW 1 and a public network, e.g. the Internet (being representative of the KPI as service data reaches the operator NW), or a non-public network such as an intranet, via which the service is provided, or at an interface with the RAN 5 being representative of the KPI as service data leaves the operator NW toward the radio device 2). Then, the NW element 3 compares 53 the first and the second values of the KPI, and based on said comparing 53, the NW element determines 54 any deterioration of the QoE over the operator network 1. The KPI is chosen such that it is relevant for the QoE at the radio device 2.

Figure 5B:
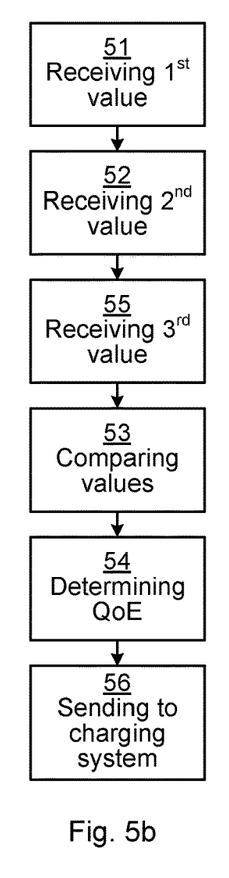
FIG. 5b is a schematic flow chart of another embodiment of a method performed by a network element, in accordance with the present disclosure.

FIG. 5a is a schematic flow chart of another embodiment of a method performed by a network element, in accordance with the present disclosure. In addition to the method steps discussed in respect of FIG. 5a, also a third value of the KPI is received 55, prior to the comparing 53. The third value may e.g. be received 55 from a second operator network node connected to the RAN 5 serving the radio device 2, wherein the third value reflects the QoE at an interface between the RAN 5 and the (rest of the) operator network 1. Then, the comparing 53 also comprises comparing the third value with the first and second values. In this embodiment, the second KPI value may e.g. be received from a first operator network node, e.g. a multi-service proxy (MSP) node, connected to a public network, e.g. the Internet, whereby the second value reflects the QoE at an interface between the public network and the operator network 1. Additionally or alternatively, the method may comprise, after the determining 54, sending 56 information about the determining 54 to the charging system 6 of the operator network 1, e.g. allowing a reduction of the charges in view of a too low QoE due to poor performance in the operator NW 1.

Figure 6:
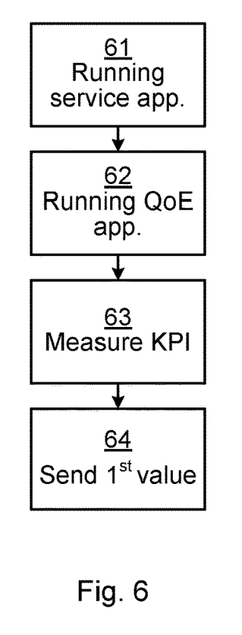
FIG. 6 is a schematic flow chart of an embodiment of a method performed by a radio device, in accordance with the present disclosure.

FIG. 6 is a schematic flow chart of an embodiment of a method performed by a radio device 2 connected to the operator NW 1, in accordance with the present disclosure. The radio device runs 61 a service application 24 of a service (service provider). At the same time, the radio device runs 61 a QoE application 25 for assessing a QoE of the service for the radio device 2. Induced by the QoE application 25, the radio device 2 then measures 63 a key performance indicator (KPI) of the service, to obtain a first value of the KPI, and sends 64 the first value to the network element 3 in the operator network 1, as discussed herein.

In some embodiments of the present disclosure, the first KPI value is sent 64 by the radio device 2, and received 51 by the NW element 3, via an over-the-air (OTA) gateway 4 as discussed herein.

In some embodiments of the present disclosure, the first value is sent 64 and received 51 via an internet protocol (IP) session with a QoE application 25 run by the processor circuitry 21 and stored in a UICC 29 comprised in the radio device 2. By storing the SW for the QoE application 25 in the UICC 29, the operator may easily provide instructions to the radio device 2 for perfuming the measurement of the KPI, without the involvement or control of the user of the radio device. The QoE application 25 may instead be controlled by the operator e.g. via the OTA GW 4. Thus, in some embodiments, the SW of the QoE application 25 is provided on a UICC 29 in the radio device 2. However, in other embodiments, the SW for the QoE application may be stored elsewhere in the storage 22 of the radio device 2.

In some embodiments of the present disclosure, the second value is received from a first operator network node, e.g. a multi-service proxy (MSP) node, connected to a public network (may be called a public data network, PDN), e.g. the Internet, whereby the second value reflects the QoE at an interface between the public network and the operator network 1.

In some embodiments of the present disclosure, the KPI is any one of bit error rate; session termination reason; uniform resource locator, URL, browsed; application software used; or loading time of application software.

EXAMPLES

The advances in OTA platform has extended the operator's network 1 into the radio devices 2 which is leveraged in the proposed framework to measure the QoE at the radio device and send it over to a QoE Decision Engine 3 to realize the business objectives of the operator.

The all IP based OTA Platform targeted towards the LTE, opens up new solution possibilities to add more value to the operator's business.

The new OTA platform provides a new UICC 29 framework that enables bi-directional IP based communication towards the OTA gateway 3 using the public network (e.g. the Internet), compared to the traditional means of using short message service (SMS) which is typically a one-way communication.

Below follow some examples based on this exemplary set up. It should be noted that the examples may be combinable with each other.

Example 1

Figure 7:
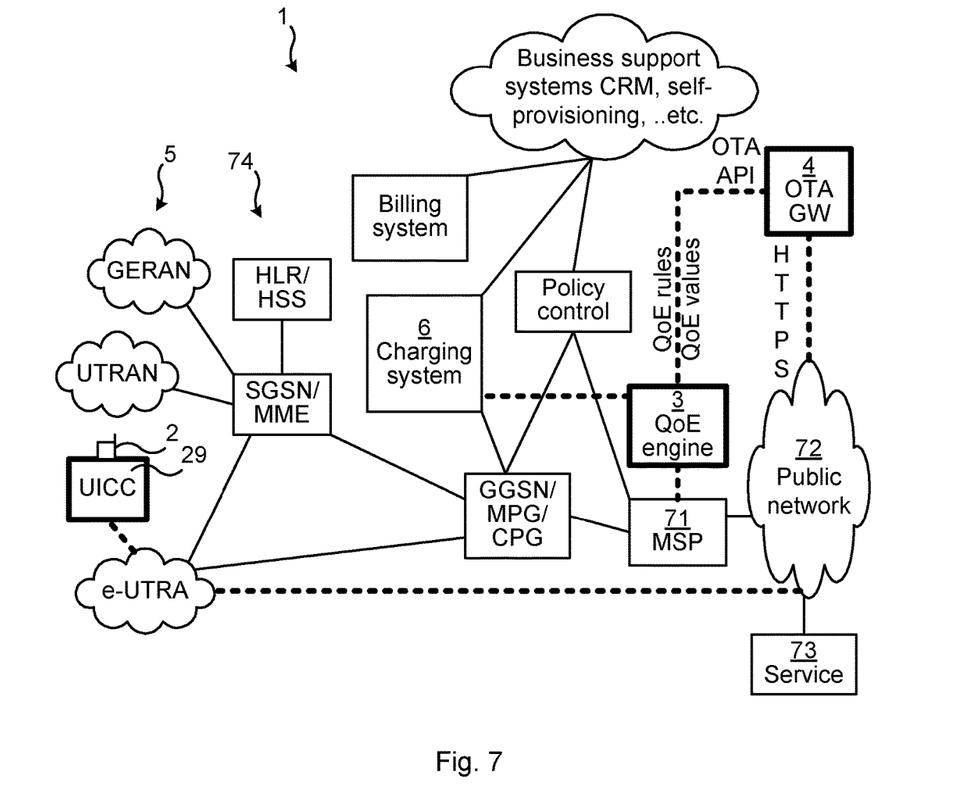
FIG. 7 is a schematic block diagram of an example embodiment of an operator network serving a radio device, in accordance with the present disclosure.

FIG. 7 shows an example of an operator network 1, comprising a core network (CN) 74 and a RAN 5, serving a radio device 2. As shown in bold lines in FIG. 7, the QoE feedback architecture comprises three main components, namely:

LTE Universal Integrated Circuit Card (UICC) 29;
OTA GW 4; and
QoE Decision Engine 3.
LTE Universal Integrated Circuit Card (UICC) 29

The UICC 29 which has the support to host a smart card web server (SCWS) would be pre-provisioned with SW for a QoE Application 25 by the operator before selling it to the subscriber who installs it in his radio device 2. The QoE application 25 which is developed based on the UICC toolkit framework may be realized as a weblet that is hosted by the SCWS on activation by the subscriber.

The QoE application 25 may contain three modules as detailed below.

1. QoE Rules Management Module 26

This module 26 is identified by a unique uniform resource identifier (URI) responsible for accepting the QoE rules from the operator via a HTTP Secure (HTTPS) interface and update the local rules repository that it manages. The rules repository may basically consist of the date on which the rule(s) is pushed by the operator, the rule(s) as such, a unique rule identifier (ID), the date on which it should get activated and/or the triggering conditions indicating whether it is time based (hourly/daily/weekly etc.) or data session based (Start/End) etc.

2. QoE Monitoring Module 27

This module 27 is responsible for executing the rules that are triggered by the triggering module 28. The execution logic of the device platform specific rule elements (typically KPI(s)) that are part of the QoE rules (e.g. bit error rate (BER), session termination reason, URL browsed, application used, application loading time etc.) are also defined in this module 27. The result of the rule executions are stored in the rule result data stores in the radio device 2 storage 22.

3. QoE Triggering Module 28

This module 28 may continuously run as a background service and triggers the QoE monitoring module 27 with the rules in the rule repository that are matching the trigger conditions. The periodic feedback of the QoE (KPI values measured) to the OTA Gateway 4 is also proposed to be created as a rule that can be triggered e.g. at the end of every data session or at the end of every hour.

OTA Gateway 4

The functionality of the OTA gateway 4 may be maintained as a middle-ware application that interfaces with the UICC 29 through the HTTPS interface over the public network (e.g. the Internet) 72, to push the QoE rules that it receives from the QoE decision engine 3 and also to forward the measured QoE KPI values back to the QoE decision engine 3 for further processing. The interface of the OTA gateway 4 with the QoE decision engine 3 may be a proprietary one that the OTA gateway vendor supports.

QoE Decision Engine (NW Element) 3

The main functionalities of the QoE engine 3 may be:

a) Interface with a Multi-Services Proxy (MSP) 71 to get the statistics (measured KPI values) related to data transfer rate of the service 73 providers.

b) Interface towards the charging system 6 to enable dynamic discounts on the subscriber accounts and subsequent notification messages to the radio device 2.

c) The analysing module 34 that is responsible of correlating the KPI values from the radio device 2 and the MSP 71 to locate the source of a problem to effectively determine the QoE and provide the appropriate benefit to the subscriber (the user of the radio device 2).

As mentioned herein, the NW element 3 may also obtain KPI values measured at the RAN 5 to determine any deteriorated QoE within the operator network 1, between the MSP 71 and the RAN 5.

Example 2

Figure 8:
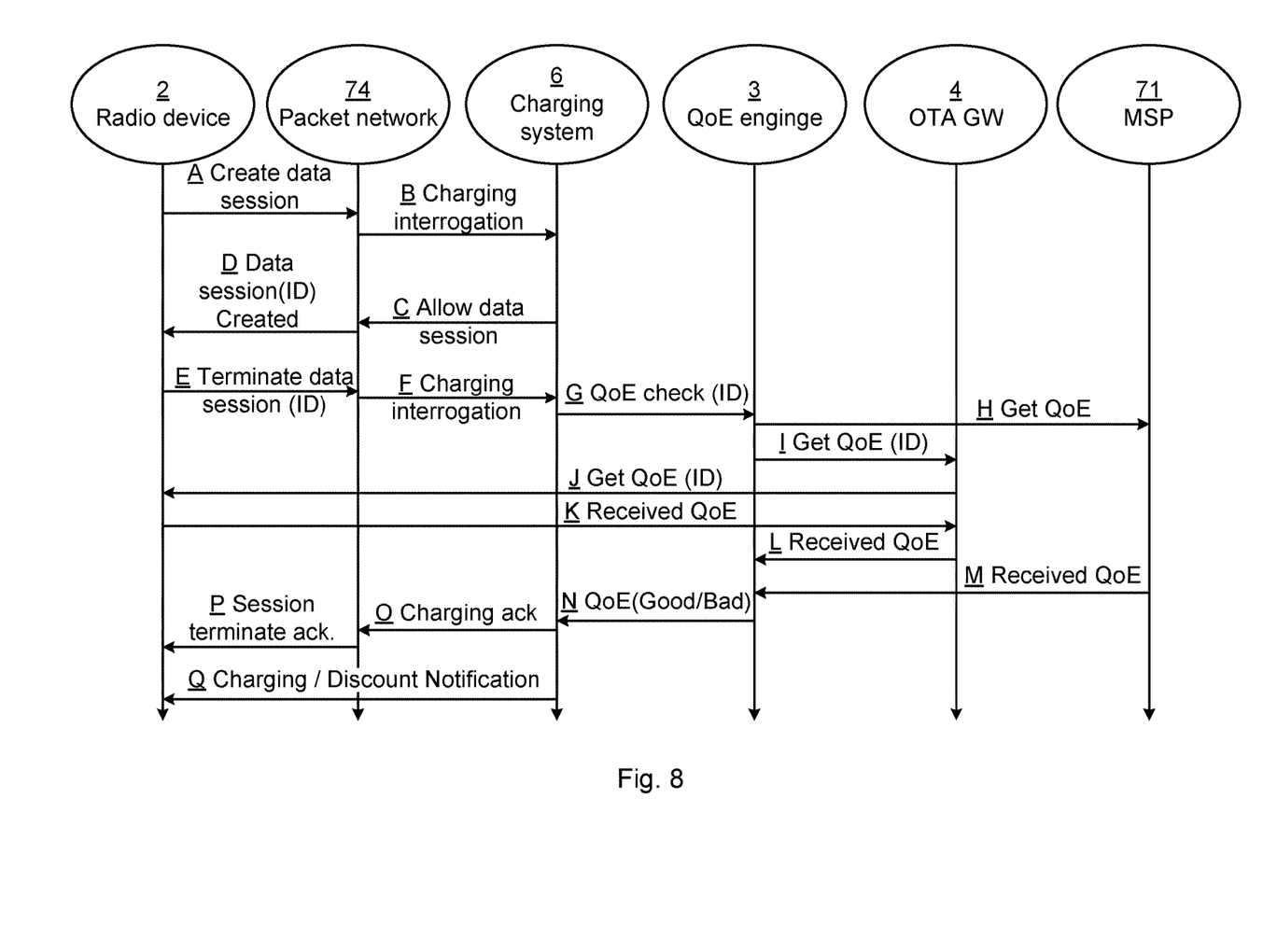
FIG. 8 is a schematic signaling diagram of example embodiments of methods in accordance with the present disclosure.

FIG. 8 is a schematic signaling diagram of example embodiments of methods in accordance with the present disclosure. The diagram is of a call scenario which reflects the role of the QoE decision engine 3 for the data session termination part of the call.

As the figure shows, for every data session termination, the charging system 6 can request the QoE of that particular data session from QoE decision engine 3 which then reflects back the nature of QoE based on the KPI values that it receives from the radio device via the OTA gateway 4 and from the MSP 71. The rating rules/configurations that exists in the charging system 6 accommodates the QoE factor which effectively is used for discounts.

The messages shown, which do not exclude the possibility of there also being other messages, are as follows:

A: The radio device sends a create data session request to the CN (packet network) 74.

B: The packet network 74 sends a charging interrogation message, with an account balance check, to the charging system 6.

C: The charging system 6 replies to the packet network 74 that the data session is allowed.

D: The packet network 74 sends a data session created message with an ID to the radio device 2, whereby the data session commences.

E: When the call is ended, the radio device 2 sends terminate data session (with the ID to identify the session) to the packet network 74.

F: The packet network 74 sends another charging interrogation message, with an account balance deduction, to the charging system 6.

G: The charging system 6 sends a QoE check inquiry (with the session ID) to the QoE engine 3.

H: The QoE engine 3 sends a get QoE message to the MSP 71.

I: The QoE engine 3 sends a get QoE message to the OTA GW 4.

J: The OTA GW 4 in its turn sends a get QoE message to the radio device 2 (also including the session ID).

K: In response, the radio device 2 sends a message comprising the measured KPI value(s) which are received by the OTA GW 4.

L: The OTA GW 4 then sends the received KPI/QoE measurements to the QoE engine 3 which processes them to determine the user QoE and the performance of the operator network 1.

M: Similarly, the MSP 71 sends its measured KPI value(s) to the QoE engine 3.

N: The QoE engine 3 informs the charging system 6 of whether the QoE was good or bad O: The charging system 6 sends a charging acknowledgement to the packet network 74.

P: The packet network 74 sends a session termination acknowledgement to the radio device 2.

Q: The charging system 6 sends a charging/discount (if the QoE was determined by the QoE engine 3 to have been too bad) notification to the radio device 2.

Example 3

FIG. 4 discloses an embodiment of OTA messaging that is proposed. The figure illustrates signaling between the OTA GW 4 and the radio device 2, e.g. the UICC 29 of the radio device 2. It shows that an HTTP request/response is made towards the UICC 29 over the public network 72 from the OTA gateway 4 based on the nature of the operation that is to be done. The radio device 2 comprises the modules 26-28 discussed in e.g. Example 1 (above). The platform (operating system) of the radio device may have a rules repository, as also discussed in Example 1. The definitions of the rules repository may also be provisioned over the OTA GW 4 by means of the HTTP request.

Figure 9:
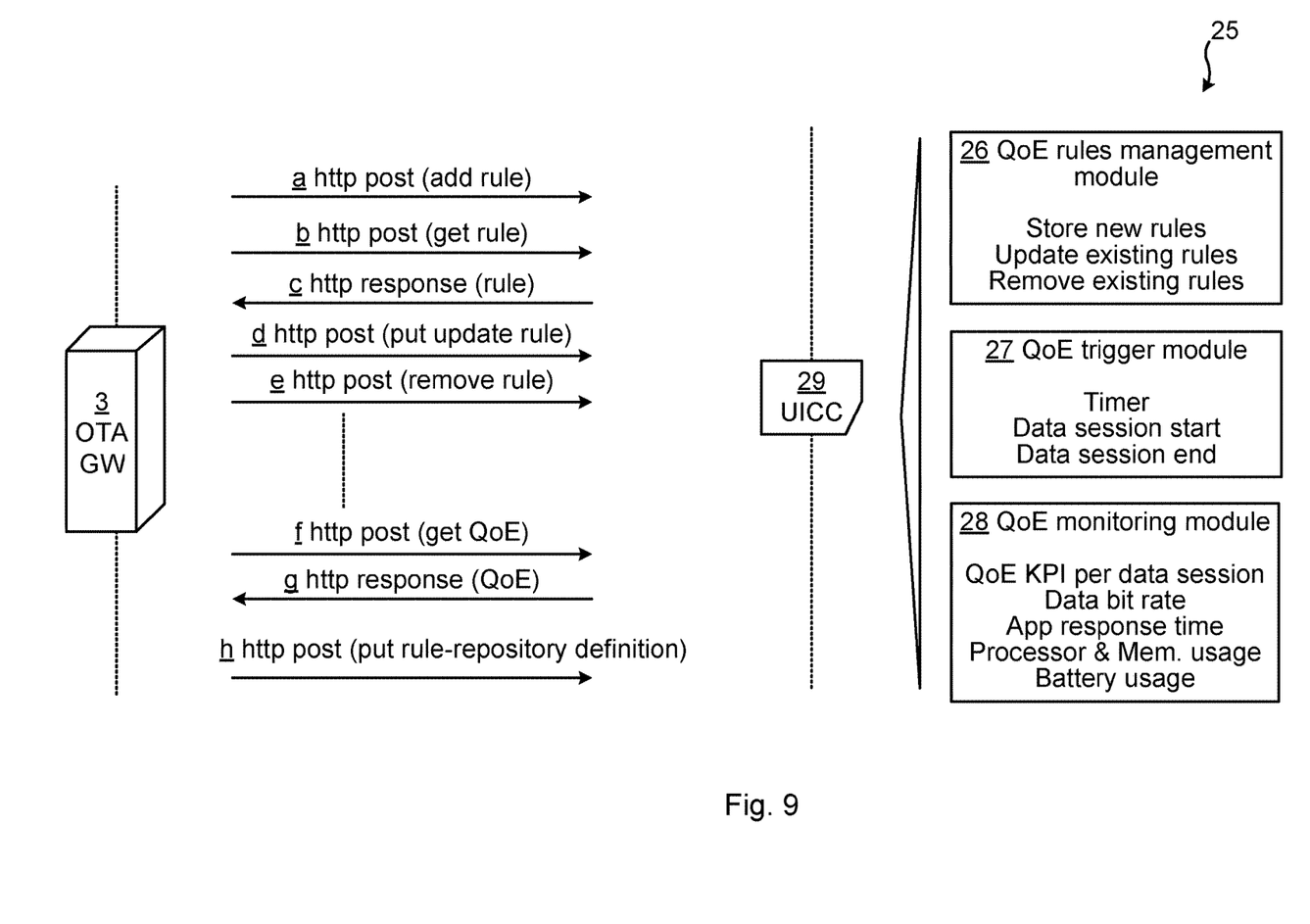
FIG. 9 is a schematic signaling diagram between an OTA gateway and a radio device UICC in accordance with example embodiments of the present disclosure.

The example signaling over the OTA GW 4 in FIG. 9, which does not exclude other signaling, is as follows, in which the "POST" process of sending HTTP requests is used:

a: An HTTP post to add a rule is sent to the radio device 2.
b: An HTTP post to get a rule is sent to the radio device 2. This implies that the OTA GW 4 request the radio device 2, e.g. a UICC 29, to send a rule(s) that it holds in its memory.
c: In response to b, the radio device 2 sends an HTTP response with the rule.
d: An HTTP post to update a rule is sent to the radio device 2.
e: An HTTP post to remove a rule is sent to the radio device 2.
f: An HTTP post to get measured QoE KPI values is sent to the radio device 2.
g: In response to f, the radio device sends an HTTP response with the measured QoE KPI values.
h: An HTTP post to put a rules repository definition is sent to the radio device 2.

These are examples of instructions which the operator network 1 may send to the radio device 2 for controlling the QoE application 25 implemented therein. Some of the instructions include an instruction to get some information, which prompts response signaling with the requested information. Thus, HTTP the communication over the OTA GW 4 is two-way communication.

Below are presented some other aspects of the present disclosure.

According to an aspect of the present disclosure, there is provided a network element 3 for an operator network 1, and for assessing a QoE of a serviced 73 for a radio device 2. The network element comprises means (e.g. the communication interfaced 33 in cooperation with the processor circuitry 31) for receiving 51 a first value of a KPI of the service 73, from the radio device 2. The network element also comprises means (e.g. the communication interfaced 33 in cooperation with the processor circuitry 31) for receiving 52 a second value of the KPI from the operator network 1 serving the radio device 2. The network element also comprises means (e.g. the processor circuitry 31, such as the analysing module 34 of said processor circuitry 31) for comparing 53 the first and the second values of the KPI. The network element also comprises means (e.g. the processor circuitry 31, such as the analysing module 34 of said processor circuitry 31) for determining 54 any deterioration of the QoE over the operator network 1, based on said comparing 53.

According to another aspect of the present disclosure, there is provided a radio device 2 configured for being connected to an operator network 1. The radio device comprises means (e.g. the processor circuitry 21) for running 61 a service application 24. The radio device also comprises means (e.g. the processor circuitry 21) for running 62 a QoE application 25 for assessing a QoE of the serviced 73 for the radio device 2. The radio device also comprises means (e.g. the processor circuitry 21, such as the QoE application 25 of the processor circuitry) for measuring 63 a KPI of the service 73, to obtain a first value of the KPI. The radio device 2 also comprises means (e.g. the processor circuitry 21, such as the QoE application 25 of the processor circuitry, in cooperation with the radio interface 23) for sending 64 the first value to a network element 3 in the operator network 1.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a network element in an operator network for assessing a quality of experience (QoE) of a service for a radio device, the method comprising:
receiving a first value of a key performance indicator (KPI) of the service from the radio device;
receiving a second value of the KPI from the operator network serving the radio device;
comparing the first and the second values of the KPI; and
determining any deterioration of the QoE over the operator network, based on said comparing,
wherein the first value is received via an internet protocol (IP) session with a QoE application of a universal integrated circuit card (UICC) comprised in the radio device.

2. The method of claim 1, wherein the first value is received via an over-the-air (OTA) gateway.

3. The method of claim 1, wherein the second value is received from a first operator network node connected to a public network, and wherein the second value reflects the QoE at an interface between the public network and the operator network.

4. The method of claim 1, further comprising:
receiving a third value of the KPI from a second operator network node associated with a radio access network (RAN) serving the radio device, wherein the third value reflects the QoE at an interface between the RAN and radio device;
wherein the comparing comprises comparing the third value with the first and second values.

5. The method of claim 1, further comprising:
sending information about the determining to a charging system of the operator network.

6. The method of claim 1, wherein the KPI is any one of bit error rate, session termination reason, uniform resource locator (URL) browsed, application software used, or loading time of application software.

7. A computer program product comprising computer-executable components for causing a network element to perform the method of claim 1 when the computer-executable components are run on processor circuitry comprised in the network element.

8. A network element comprising:
processor circuitry; and
a storage unit storing instructions that, when executed by the processor circuitry, cause the network element to:
receive a first value of a key performance indicator (KPI) of a service from a radio device;
receive a second value of the KPI from an operator network serving the radio device;
compare the first and the second values of the KPI; and
determine any deterioration of the QoE over the operator network, based on said comparing,
wherein the first value is received via an internet protocol (IP) session with a QoE application of a universal integrated circuit card (UICC) comprised in the radio device.

9. A computer program product for assessing a quality of experience (QoE) of a service for a radio device, the computer program product comprising a non-transitory computer-readable storage medium storing computer program code which is able to, when run on processor circuitry of a network element in an operator network, cause the network element to:
receive a first value of a key performance indicator (KPI) of the service from the radio device;

receive a second value of the KPI from the operator network serving the radio device;

compare the first and the second values of the KPI; and determine any deterioration of the QoE over the operator network, based on said comparing, wherein the first value is received via an internet protocol (IP) session with a QoE application of a universal integrated circuit card (UICC) comprised in the radio device.

10. A method performed by a radio device connected to an operator network, the method comprising:

running a service application; and running a quality of experience (QoE) application for assessing a QoE of the service for the radio device, the QoE application causing the radio device to:

measure a key performance indicator (KPI) of the service, to obtain a first value of the KPI; and send the first value to a network element in the operator network, wherein the QoE application is provided on a universal integrated circuit card (UICC) in the radio device.

11. The method of claim 10, wherein the first value is sent via an over-the-air (OTA) gateway.

12. A computer program product comprising computer-executable components for causing a radio device to perform the method of claim 10 when the computer-executable components are run on processor circuitry comprised in the radio device.

13. A radio device comprising:

processor circuitry; and a storage unit storing instructions that, when executed by the processor circuitry, cause the radio device to:

run a service application of a service; and run a quality of experience (QoE) application for assessing a QoE of the service for the radio device, the QoE application causing the radio device to:

measure a key performance indicator (KPI) of the service, to obtain a first value of the KPI; and send the first value to a network element in the operator network, wherein the QoE application is provided on a universal integrated circuit card (UICC) in the radio device.

14. A computer program product comprising a non-transitory computer-readable storage medium storing computer program code which is able to, when run on processor circuitry of a radio device connected to an operator network, cause the radio device to:

run a service application of a service; and run a quality of experience (QoE) application for assessing a QoE of the service for the radio device, the QoE application causing the radio device to:

measure a key performance indicator (KPI) of the service, to obtain a first value of the KPI; and send the first value to a network element in the operator network, wherein the QoE application is provided on a universal integrated circuit card (UICC) in the radio device.

* * * * *